No. 711,011. Patented Oct. 14, 1902.
J. & P. W. SOMMER.
FENCE MAKING MACHINE.
(Application filed Feb. 10, 1902.)
(No Model.) 6 Sheets—Sheet 1.

Witnesses:
Cho. W. LaPorte
J. E. Strawn

Inventors.
Peter W. Sommer
John Sommer
By W. V. Tifft
their attorney

No. 711,011. Patented Oct. 14, 1902.
J. & P. W. SOMMER.
FENCE MAKING MACHINE.
(Application filed Feb. 10, 1902.)

(No Model.) 6 Sheets—Sheet 2.

Witnesses:
Chas H LaPorte
J. E. Strawn

Inventors:
John Sommer
Peter W. Sommer
By W. V. Tefft
Their Attorney

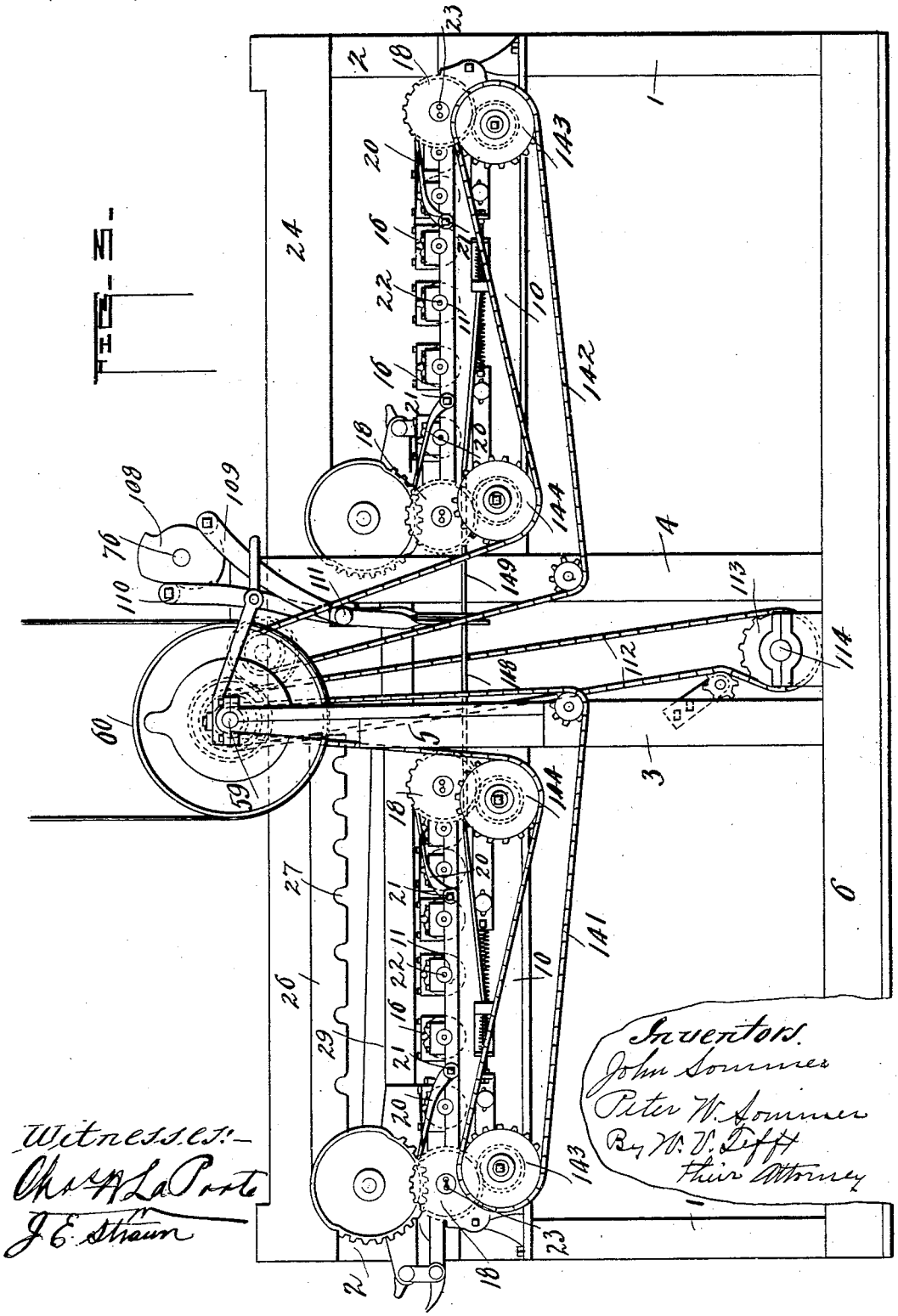

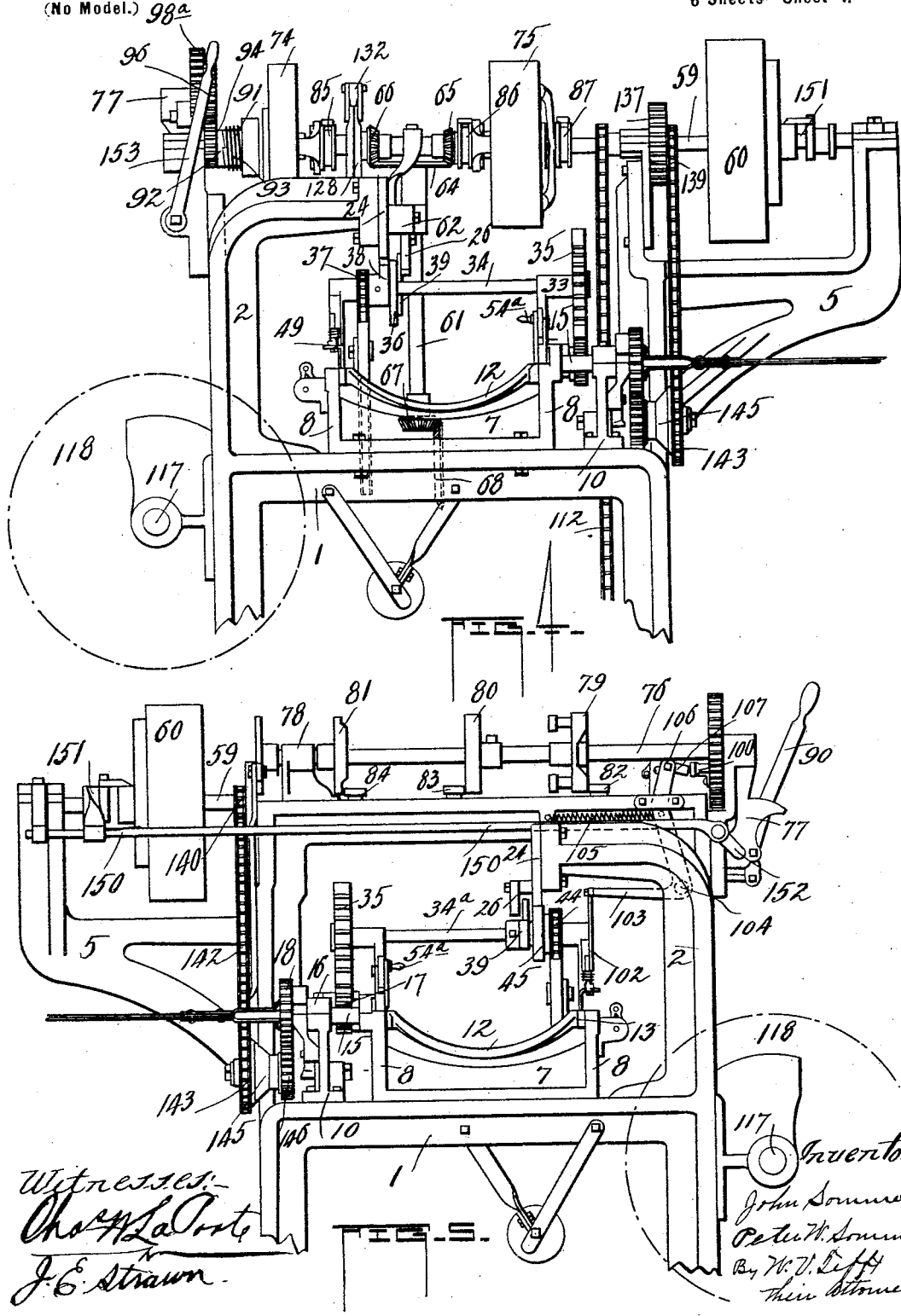

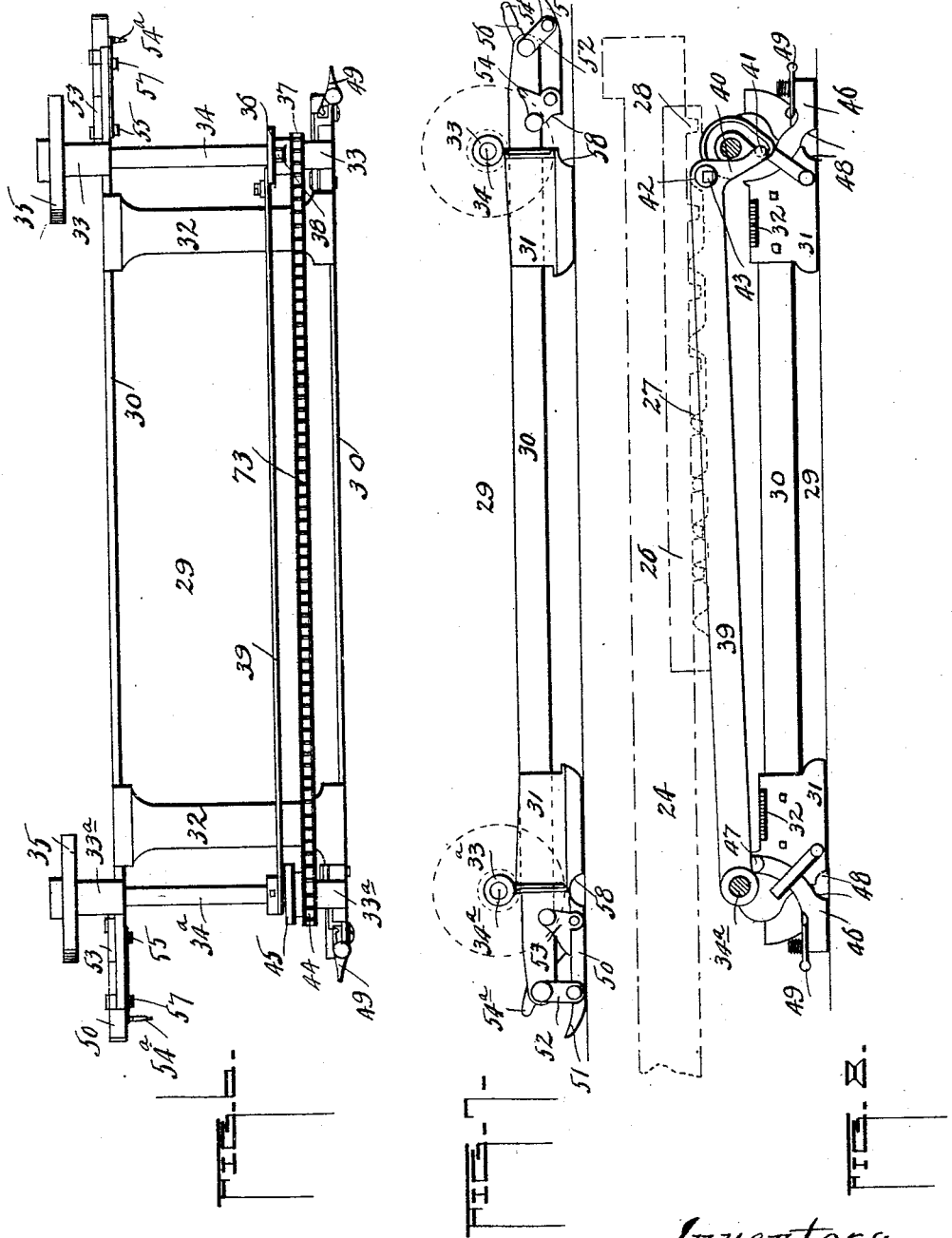

No. 711,011. Patented Oct. 14, 1902.
J. & P. W. SOMMER.
FENCE MAKING MACHINE.
(Application filed Feb. 10, 1902.)
(No Model.) 6 Sheets—Sheet 6.
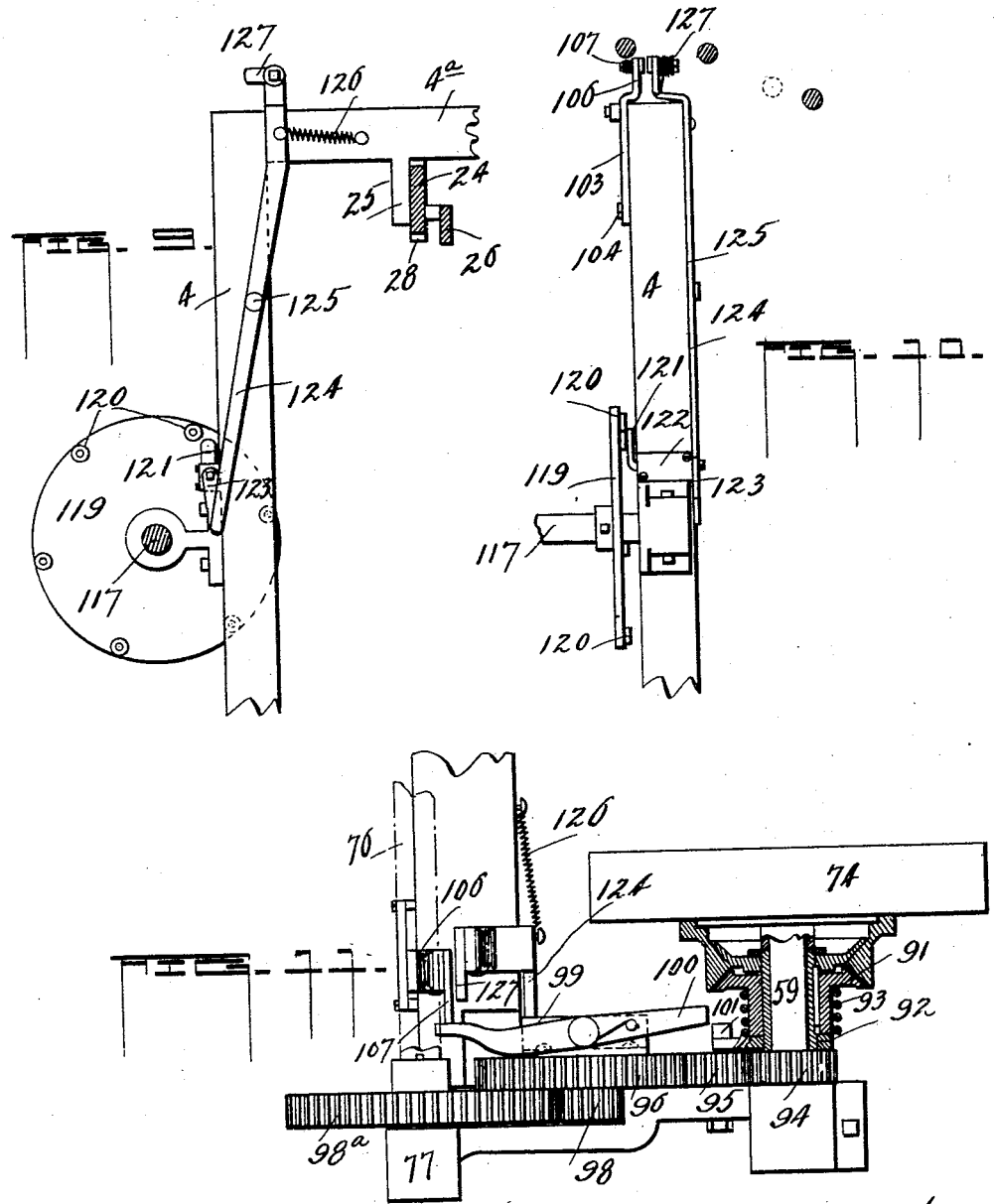
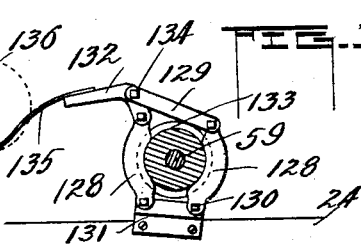

UNITED STATES PATENT OFFICE.

JOHN SOMMER, OF POINT LOOKOUT, UTAH, AND PETER W. SOMMER, OF PEORIA, ILLINOIS.

FENCE-MAKING MACHINE.

SPECIFICATION forming part of Letters Patent No. 711,011, dated October 14, 1902.

Application filed February 10, 1902. Serial No. 93,373. (No model.)

*To all whom it may concern:*

Be it known that we, JOHN SOMMER, residing at Point Lookout, in the county of Box Elder and State of Utah, and PETER W. SOMMER, residing at Peoria, in the county of Peoria and State of Illinois, citizens of the United States, have invented certain new and useful Improvements in Fence-Making Machines; and we do hereby declare that the following is a full, clear, and exact description of the invention, which will enable others skilled in the art to which it appertains to make and use the same.

This invention relates to a machine for manufacturing woven-wire fence, the principle of which is the provision of a suitable bed-frame on which is mounted a double series of twister-sections through which strand or web wires are carried and of a carriage adapted to travel in a plane parallel with and above the sections, arranged to carry in its opposite ends spools around which are wound weft-wires, designed as the carriage is moved back and forth or from side to side to alternately and simultaneously match with each of the successive sections of each series in the bed to form a spindle and to be revolved together to form the twist of weft-wires with each of the strand-wires.

The object of our invention is in the simplicity of operation and construction of the carriage designed to carry the weft-wire, carrying suitable devices intermittingly actuated to be locked with part of the bed-frame for imparting a stopping and starting movement to the carriage as the weft-wires are successively coincident with the web or strand wires in the bed; and the further object of the invention is the provision of devices for advancing and reversing the carriage and for actuating suitable mechanism for controlling the clamps.

Our invention embodies many other details of construction, which are added as supplemental parts materially essential in perfecting the operation of the machine.

That our invention may be more fully understood, reference is had to the accompanying drawings, in which—

Figure 1:
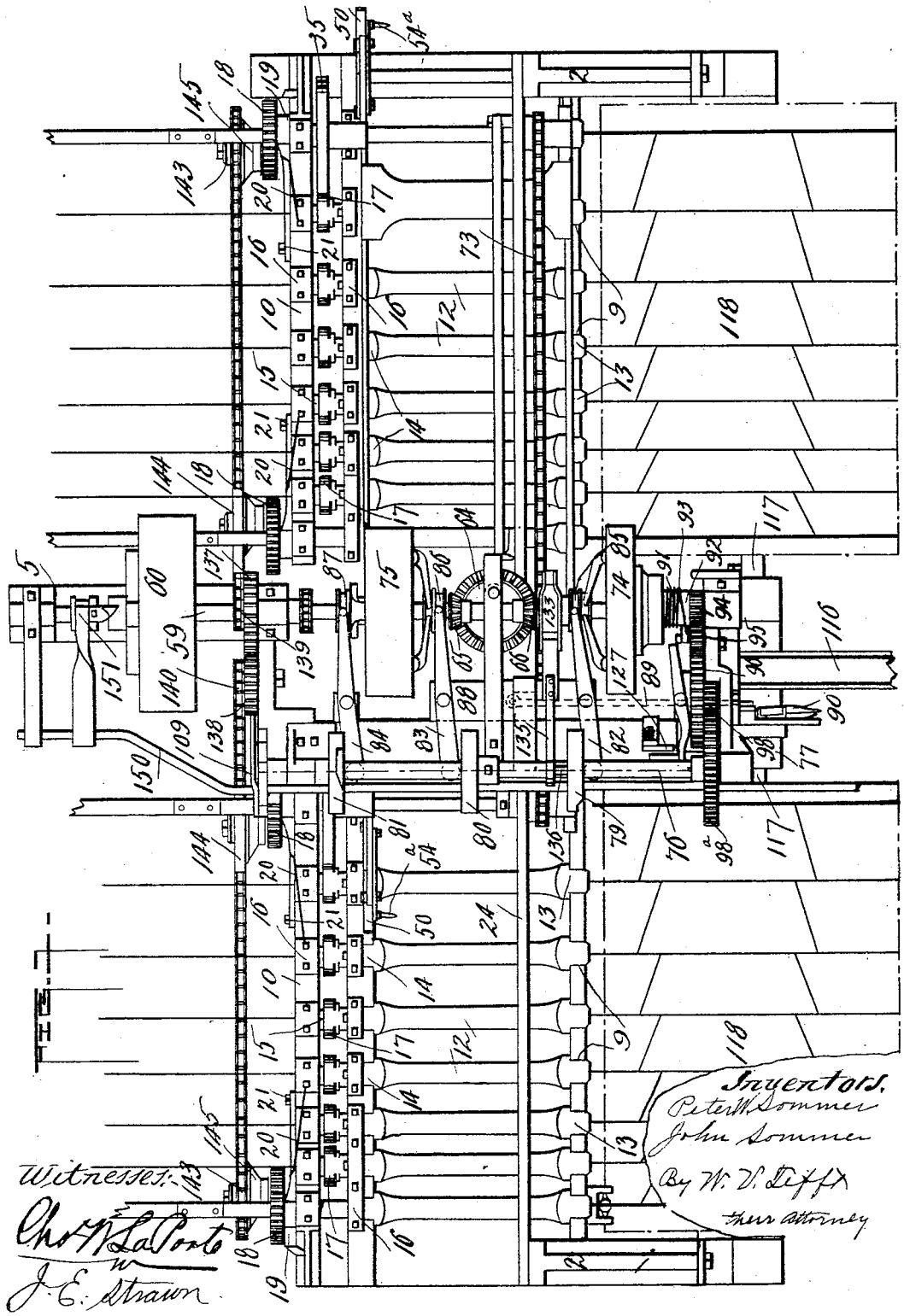
Figure 2:
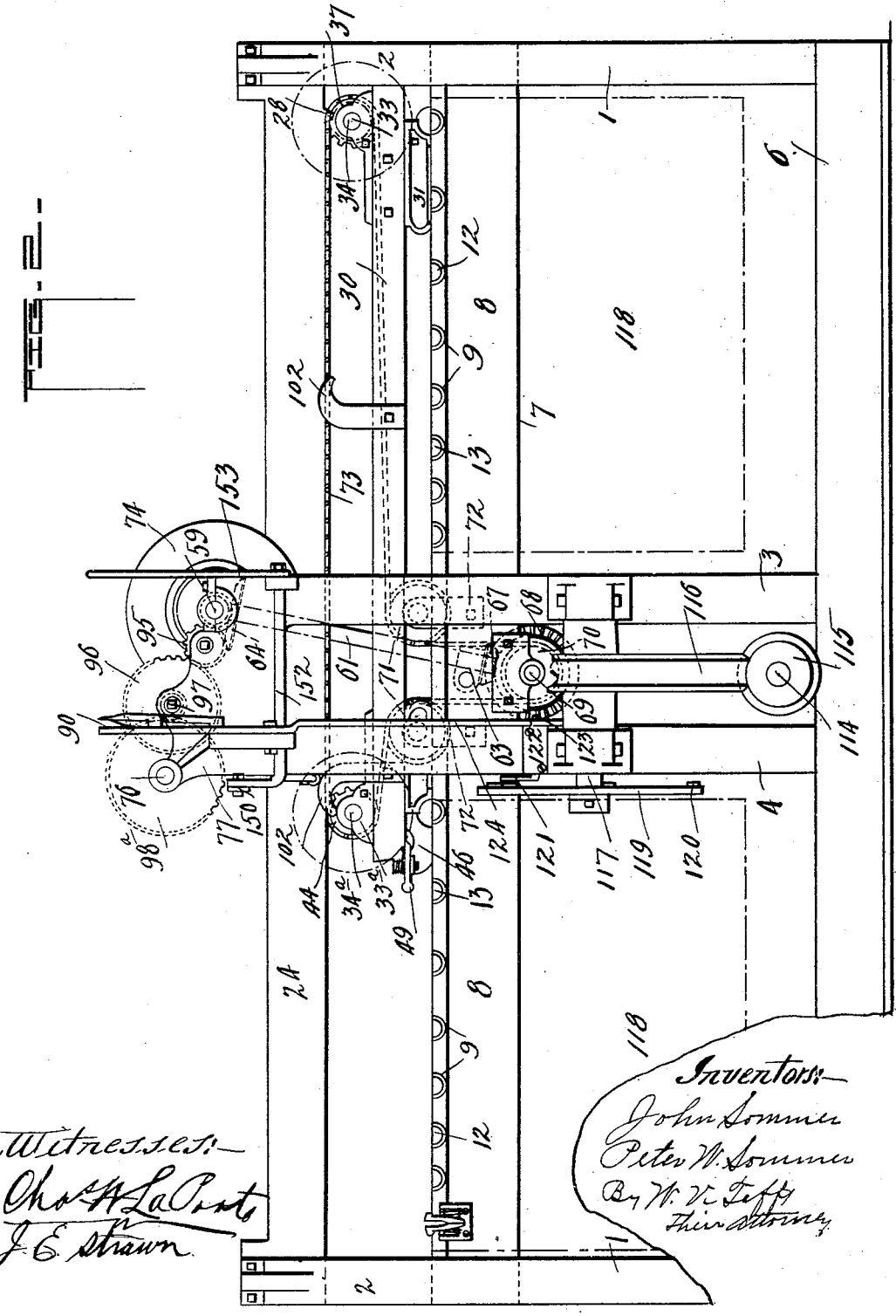

Figure 1 is a plan view of our machine. Fig. 2 is a front elevation of the same. Fig. 3 is a rear elevation. Fig. 4 is an elevation of one end of the machine. Fig. 5 is a view from the opposite end. Fig. 6 is a plan view of the carriage. Fig. 7 is an elevation of one side. Fig. 8 is a longitudinal section through the carriage and showing certain frame parts in dotted lines. Fig. 9 is a section in elevation, showing parts for intermittingly actuating certain clamp parts. Fig. 10 is a front elevation of Fig. 9. Fig. 11 is a plan view showing certain reversible parts. Fig. 12 is a view showing details of brake mechanism for stopping the carriage as it reaches the end of its movement.

Like numerals of reference indicate corresponding parts throughout the figures.

The framework for supporting the working parts of our machine comprises the outer frame-supports 1, with the extensions 2 and the centrally-disposed frames 3 and 4, the frame 3 having the outer yoke portion 5 for supporting the power devices and the frame 4 having the cross-piece 4ª. This structure is connected by the ground-plates 6, as shown.

The construction of this machine, considering the framework for supporting the power devices and the bed on which the carriage reciprocates, together with the twister-sections and the clamping devices, is similar to that described in patent bearing No. 651,785 and dated the 12th day of June, 1900.

7 is a bed-plate having the side flanges or extensions 8, the bed-plate resting upon and being suitably secured to the frames 1, 3, and 4, and the upper faces of the flanges 8 are provided with semicircular notches or grooves arranged at graduated distances from opposite ends of the bed to points near the center thereof; and as this machine is designed especially for making double the amount of fence as is made on a single machine of the same type, starting from the right-hand side of the bed looking at Fig. 1 the semicircular notches or grooves are arranged at graduated distances, the distance being less and less as they near the center of the machine, and starting from the opposite side of the bed the distance between them is continuously greater to a point near the center of the bed. Thus it will be seen by the use of a single carriage carrying twister-sections at its opposite ends and imparting a starting and stopping movement to the carriage the twister-sections thereof will be coincident with similar notches in the bed successively as the carriage reciprocates thereon.

10 is a frame-support arranged at the rear of the bed 7 and supported by the frames 1, 3, and 4, and the same is provided with semicircular notches 11 opposite to and substantially in number with the notches 9 in the bed. 12 refers to twister-sections bowed, substantially in the manner shown, and their outer ends have semicircular bearings rotatably journaled in the semicircular notches or grooves 9, and their inner ends have flattened upper and semicircular portions at 14, having bearings in the notches 9 in the opposite side of the bed, and 15 denotes round extensions which have a bearing in the semicircular notches 11 of the frame 10, and 16 denotes half-boxings covering the inner journals of the twister-sections 12, and 17 refers to segmental gears carried on the portions 15 of the twister-sections 12 between the frame 10 and the inner flange 8 of the bed.

The extreme inner and outer sections 12 are referred to as "cable-sections" and are journaled in like manner to the bed and frame 10 as the other sections, but are minus the pinions 17, having their ends rounded and, being longer than the intermediate sections, extend through their boxings in the frame 10 and carry on their inner end the pinion 18 and the cam 19, and engaging with said cams are arms 20, pivotally secured to the frame 10 at 21. The sections between the cable-sections are termed "intermediate" sections, and they are each provided with a central perforation or groove 22, through which a single strand-wire passes, and 23 denotes duplicate perforations or grooves passing through the cable-sections, through which duplicate strand-wires are passed to be twisted in the form of a cable, emerging from the opposite side.

24 is a cross tie or plate secured at its opposite ends to the extensions 2 of the frames 1 and to a lip 25, extending from the frame part 4$^a$, and 26 is a suitable frame or plate attached in a suitable manner to the cross-tie 25, and its lower face is provided with a single series of grooves arranged at graduated distances from each other in manner like the semicircular notches in the bed-plate and corresponding in number to one series thereof, and 28 refers to lugs or stops depending from the cross-tie 24 and corresponds in number to the notches 9 in the bed, forming one series and approximately in line and above the central bearing-line of the twister-sections.

29 refers to a carriage arranged to be intermittingly reciprocated on the bed 7, on which it is supported. This carriage comprises the side frame-supports 30 and the shoes 31, connected by the cross-plate 32, the shoes being adapted to travel over the upper face of the side flanges 8 of the bed.

33 and 33$^a$ are tubular bearings forming a part of the shoes 31, and in the same are journaled the transversely-carried shafts or spindles 34 and 34$^a$. On the inner ends of the spindles 34 and outside of the frame-supports 30 are provided the segmental gears 35, arranged to successively intermesh with and actuate the pinions 17 for rotating the intermediate twister-sections. On the opposite end of the shaft 34 is provided the cam 36 and a sprocket-wheel 37, and 38 is a lug extension extending up from the cam.

39 is a reach pivotally secured to the shaft 34$^a$, and its free end has a curved extension at 40, carrying a roller at 41, movable in an open face in the cam, and 42 is a roller journaled at 43 on said reach, and 44 refers to a sprocket-wheel carried by the shaft 34$^a$ and similar to the pinion 37 on the shaft 34, and 45 is a roller forming a part of the sprocket 44. It is purposed to carry corresponding twister-sections in opposite ends of the carriage to that of the twister-sections in the bed, arranged for carrying a coil of wire forming the weft or stay wire, which is alternately fed to and twisted with the cable, and intermediate strands of wire passing through the twister-sections, and devices are arranged at opposite ends of the carriage whereby the sections carrying the coil or spool of wire may be easily adjusted to or removed from the carriage; and while these spool-sections of the carriage are not shown it is to be understood that their outer ends are of such shape that they correspond to the cable and intermediate sections, whereby when power is imparted to the cable or twister sections they will impart corresponding movement to the spool-sections of the carriage. The devices for securing the sections of the carriage carrying the spool with the weft or stay wire are slightly different upon opposite sides of the frame 30. The outside devices upon opposite ends comprise the plates 46, pivoted at 47 to the shoes 31, and 48 are cut-out portions of the matching faces of the shoes 31 and the plates 46, forming a semicircle and a journal-bearing for the outer ends of the spool-carrying sections. To retain the swinging plates in locked positions for holding one end of the carriage-sections in place is provided the key 49, the inner end held, by means of a spring, under the lower edge of the outer end of the frames 30. The releasing of the key 49 from the frame 30 permits the swinging plates 46 to be raised or locked in the manner described, as desired. On the opposite frames 30 the locking devices are modified slightly, as has been suggested, and comprise the shoe 50, having the outer beveled portion 51, and the same are pivotally connected with the frame through the short arms 52 and 53, and the arm 53 is provided with an extension 54, arranged when the shoe is in a locked position to engage its upper face for retaining it in such position, and 54$^a$ refers to a lever pivoted at 55 to the shoe and is provided with the notch 56 on its lower face engaging with an extension 57 on the ends of the frame 30. Thus it will be seen to release the shoe 50 by raising the lever 54ª to disengage the notch 56 from the extension 57, and by pulling upon the lever it will impart a forward upward movement of the shoe 50, and to lock the shoe in position after placing the spool-section in position in the carriage the movement of the lever is reversed and the notch thereof caused to engage the extension 57 and the extension 54 of the short arm 53 with the upper face of the shoe, and 58 denotes cut-out portions of the shoes 31 and 50, forming a semicircular journal-bearing for the spool-sections similar to that shown upon the opposite side of the carriage.

The power devices for imparting movement to the carriage comprises the power-shaft 59, journaled in bearings in the frame 3, and carries the driving-pulley 60, connected by suitable clutch parts to be further described.

61 refers to a vertical shaft journaled in the bearings 62, secured to the frame extension 2 and the lower end in the bearing 63.

64 is a bevel-gear carried by the upper end of the shaft 61, and the same is arranged to be intermittingly engaged by the bevel-pinions 65 and 66, carried by the power-shaft 59, and on the lower end of the shaft is a bevel-pinion 67, intermeshing with a bevel-gear 68, carried by the cross-shaft 69, and 70 is a sprocket-wheel, also carried by the shaft 69, and 71 denotes duplicate sprocket-wheels supported by the plates 72 from the bed 7, and 73 is an endless chain belting traveling over and around the sprocket-wheels 37 and 44 of the carriage and extending around the sprocket-wheels or "idlers," as they may be termed. 71 engages with and travels around the sprocket 70 on the cross-shaft 69, receiving its power from the power-shaft 59 through the vertical shaft 61. With this description of the frame parts and power devices and the connection of the power devices with the carriage the step-by-step movement imparted thereto will be described—that is, the movement of the carriage from cable-section to cable-section. The carriage in the position shown in the drawings is about ready to be reciprocated across its bed, and the working parts of the machine being in a position to permit of such movement the cam 36 will be rotated slightly, so as to bring the roller 41 on the arm 39 to its lowermost point in the cam. This movement will cause the roller 42 to slip out of the notch 27 of the bar 26 in such a manner to cause it to engage the lower smooth surface of the bar 26, and the actuation of the chain 73 will cause the carriage to be fed across the bed until the lug 38 of the cam 36 contacts with one of the depending lugs 28 of the cross-tie 24, and simultaneous with such engagement the cam 36 will have rotated in such a position as to cause the roller 42 of the arm 39 to engage with the next successive slot 27 of the bar 26, and during the period of stopping at these successive slots 27 the spool-sections of the carriage are coincident with the successive strand-wires in the bed and mechanism is brought into play for causing the weft-wire of the spool and the strand-wires to be twisted together, and the mechanism is further carried out so that during the rotation of the cam 36 the lug 38 thereof will be caused to engage the opposite sides of the depending lug 28 of the cross-tie 24 and the roller 42 is released from the notch 37 and the carriage caused to be reciprocated until the roller 42 is caused to engage the next succeeding slot 27 for retaining the carriage in a locked position during the twisting of the weft-wire with the strand-wires coincident therewith. During the movement of the carriage the roller 45 on the shaft 34ª of the carriage bears against the lower smooth surface of cross-tie 24 for firmly holding this end of the carriage to its work.

On the power-shaft 59, on which is arranged the power-clutch 60, is provided the clutches 74 and 75, having clutch-operating parts intermittingly thrown into and out of mesh for advancing the carriage in opposite directions on the bed for rotating certain clamp parts for drawing the wire from the twister-sections and for throwing into play certain mechanism for actuating the cable twister-sections.

76 is a transverse shaft journaled in the bracket 77 and in the boxing 78, carried by the frame 4. On this shaft is carried the cam 79, and the cams 80 and 81 and 82, 83, and 84 are clutch-arms pivoted to suitable frame parts and carry rollers on their outer ends movably engaged by the cams and their opposite ends engaging the clutch parts 85, 86, and 87. The clutch-arms 82 and 83 are pivotally secured to a movable plate 88, and the object of pivoting these clutch-arms to a movable frame is to provide for the ready and quick adjustment of throwing in or reversing the clutches 85 and 86, as might be necessary at any time during the movement of the carriage in either direction across the bed. This is accomplished through the rod 89, connected with a shiftable plate 88, which is connected with the lever 90, pivoted on the supports 77. It is through the operation of parts to be described that the clutch-levers 82 and 83 are actuated through the rotation of the shaft 76 for the purpose of throwing into or throwing out the clutch parts 85 and 86 for actuating alternately the bevel-pinions 65 and 66 for rotating the shaft 61 through the bevel-gear 64 for imparting movement to mechanism above described for reciprocating the carriage on its bed.

Referring to the power-shaft 59, suitable clutch parts 91 and of the clutch 74 are shown engaging clutch parts 92, normally held by the spring 93, and 94 is a spur-gear carried by the clutch part 92 and intermeshes with a small pinion 95, which in turn meshes with the gear 96, carried on a short spindle 97, and 98 is a pinion also carried on the spindle 97, intermeshing with a gear-wheel 98 on the shaft 76. On the rear face of the gear 96 is fastened a bracket 99, on which is pivotally secured an arm 100, with its outer end arranged to be engaged by parts to be described and its inner end arranged for engaging a lug 101, forming a part of the clutch part 92, which said arm 100 is intermittingly actuated for releasing or locking the locking parts 91 and 92 for imparting rotation to the shaft 76 through the gearing just above described.

During the reciprocation of the carriage, or, rather, when the carriage in its movement reaches the far end of the bed on either side and when the spool-sections of the carriage are coincident with the cable-sections of the bed, the mechanism for actuating the cable-sections are brought into play. 102 represents engaging plates supported by the sides 30 of the carriage, and simultaneously as the carriage spool-sections are coincident with the cable-sections the engaging plates 102 will engage with an arm 103, pivoted at 104 on the frame 4, and the same held in a normally fixed position by a spring 105, and 106 is an extension of said arm and carries the spring-held finger 107, which is movable through the action of the engaging plates 102 through the arm 103 with the plates 100 for throwing into engagement the clutch parts 91 and 92 for actuating the shaft 76 through the gearing 94, 95, 96, 98, and 98$^a$, above described, and such movement of the shaft 76, which carries the cam 108, will engage with arms 109 and 110, which are pivoted at 111, for the purpose of releasing certain clutch parts on the cable-sections for the purpose of twisting the same, and it is also during such movement of the shaft 76 that the cam 81 is caused to throw in certain clutch parts 75 through the arm 84 for moving the clamp for drawing out the mesh during the twisting of the cable-sections. This movement may be further understood by referring to the parts operating to cause a partial rotation of the clamps, which consists of the chain belting 112, engaging a sprocket on the power-shaft 59 and a sprocket 113 on a transverse shaft 114, located down in the bed, carrying on one end a worm 115, which intermeshes with a worm-wheel 116 on a shaft 117, which carries duplicate clamps 118. These clamps are not shown, but are indicated by dotted lines in Fig. 2 and are substantially similar to the patent referred to above, and on one of these clamps is provided a plate 119 with a series of rollers 120, and it is during the partial rotation of the clamp which carries the plate 119 that the rollers 120 are caused to engage with an arm 121, pivotally secured in a boxing 122, and this arm 221 carries a plate or cam 123 for moving an operating-arm 124, pivoted at 125 to the frame and which is normally held by a spring 126. On the upper end of the operating-arm 124 is provided a spring-held finger 127, which when the arm 124 is actuated through the mechanism just described the same will be caused to engage the outer end of the arm 100 for releasing the same for the purpose of stopping the rotating of the clamps and the twisting of the cable-strands through the mechanism described for imparting movement thereto. It is understood that in the movement of the shaft 76 it is timed in such a manner that the parts for moving the carriage are locked for a short period of time as the same reaches opposite ends of the bed, and after a certain amount of cable-strand is twisted the clutch working opposite to the one for feeding the carriage to one end of the bed is brought into play for reversing the movement of the chain 73 for moving it to the opposite end of the bed, and when the carriage reaches the end of the bed we have provided a brake-shoe for insuring a positive stop of the carriage as it reaches the end of its movement. This comprises the arms or shoes 128, engaging a drum 129 on the shaft 59. The shoes are pivotally connected at 130 with a plate 131, secured to the cross-ties 24, and 132 is an arm connected with the free end of one of the shoes 128, and 133 are straps connected with the free end of the opposite shoe and at 134 with the arm 132, and 135 is a spring-arm connected with the free end of the arm 132 and has its outer end lying in the path of travel of rollers 136, carried by the cam 79, which when engaged by said rollers will cause the shoes to hug the drum in the manner shown in Fig. 12 of the drawings.

The mechanism coöperating with the power-shaft and connecting devices of the shaft 76, through the levers 109 110, is substantially similar in detail and operation to that referred to and claimed in Patent No. 651,785, now owned and controlled by us, and it is not thought necessary to describe these parts except that chain belting is employed in this device for actuating the clutches which partially control the rotation of cable-twisting sections. On the power-shaft 59 is carried a spur-gear 137, intermeshing with the supplemental gear 138, and the gear 137 carries a sprocket-pinion 139, and the gear 138 carries a sprocket 140, and 141 142 refer to chain belting receiving its power from the sprocket-pinions 139 and 140 and imparts motion to the inner and outer sprocket-wheels 143 and 144 of the cable-sections which are connected with clutch parts 145, and the clutch parts arranged with gears 146, intermeshing with the gears 18, above referred to, controlled through the action of certain parts substantially the same as in the patent referred to, and locked and released through the rods 148 and 149 by the lateral movement imparted to the levers 109 110 through the action of cam 108 by a predetermined movement imparted to the shaft 76.

Referring to the power-clutch, 150 is an operating-arm connected with clutch parts 151 for throwing in and out connections between the power-clutch 60 and the power-shaft 59.

This is accomplished through the connection 152 with the rod 150 and lever 153, as shown.

We are aware of the existence of patents—as, for example, our own—containing substantially the parts and mechanism, such as the frame, bed, clamping devices, and means of pulling the strands and cable-wires through the twister-sections and for causing the rotation of the clamps and twisting the weft-wires on the carriage with the strand and cable wires, and of feeding and winding the finished wire fence on suitable winding devices; but we are not aware of a carriage controlled and reciprocated on its bed substantially in the manner as we have described, nor for locking the same, or releasing the parts which control the step-by-step movement of the carriage across the bed, nor for controlling the movement of the clamping parts. We are further aware that various changes may be made in the devices herein claimed, and the construction and arrangement of parts varied to suit conditions and details resorted to without affecting the principle of invention herein.

Having thus fully described our invention, what we claim, and desire to secure by Letters Patent of the United States, is—

1. In a wire-fence machine, the combination with a stationary frame supporting a bed-frame, of a suitable carriage carried and having a bearing and sliding relation thereon, transverse shafts supported at opposite ends of said carriage, chain belting engaging pinions on said shafts and traveling around and receiving momentum from mechanism connected with reversible clutch parts arranged in the stationary frame, substantially as described.

2. In a wire-fence machine, the combination with a stationary frame supporting a bed-frame, of a shiftable carriage carried and having a bearing and sliding relation thereon, transverse shafts of said carriage with sprocket-wheels engaged by chain belting reversibly connected with power devices in the stationary frame, a cam on one shaft and a reach movably connected with said cam having a rolling member arranged to intermittingly engage a series of recesses in certain frame parts, substantially in the manner and for the purpose described.

3. In a wire-fence machine, the combination with a stationary frame supporting a bed-frame, of a suitable carriage carried and having a bearing and sliding relation thereon, transverse shafts supported on the carriage, chain belting connecting pinions on the shafts and engaging power devices in the frame actuated through reversible clutch parts on the power-shaft, a cam on one of said shafts of the carriage and a lug extension from said cam, a reach having its free end movably connected with said cam and provided with a rolling member intermittingly engaged and released with recesses in a stationary bar and suitable stops arranged in the frame intermittingly engaged upon opposite sides by the lugs on the cam during the step-by-step movement imparted to the carriage, substantially in the manner and for the purpose described.

4. In a wire-fence machine, the combination with a stationary frame supporting a bed-frame, of a shiftable carriage carried and having a bearing and sliding relation thereon, transverse shafts journaled on said carriage and connected with power devices supported in the stationary frame for reciprocating said carriage, a cross-tie of the stationary frame provided with a series of depending lugs arranged at graduated distances and a supplemental bar supported by the cross-tie arranged with a series of graduated recesses, a revoluble member carried by one shaft and an arm with a roller movably connected with said revoluble member arranged to be moved at predetermined periods for causing the roller of the arm to intermittingly engage the recesses in the bar, and a lug or finger carried by the cam arranged to intermittingly engage the stops on the cross-tie simultaneous as the roller engages the recesses for imparting a step-by-step movement to the carriage as it traverses the bed, substantially as described.

5. In a wire-fence machine, the combination with a stationary frame supporting a bed-frame, of a shiftable carriage carried and having a bearing and sliding relation thereon, transverse shafts supported by said carriage carrying sprocket-pinions engaged by chain belting receiving its momentum through devices in the frame actuated through the vertical shaft 61 from reversible clutch parts on the power-shaft 59, a series of stops in the frame and a series of recesses suitably arranged, the recesses and stops intermittingly engaged by mechanism having a predetermined movement for stopping and starting said carriage at graduated distances on the bed, swinging shoes suitably carried at opposite ends of the carriage and together with side frame supports thereof forming a journal in which may be seated a frame carrying a weft or stay wire arranged substantially in the manner described.

6. In a wire-fence machine, composed of the bed-frame, a series of twister-sections supported in said frame and adapted to have strand-wires carried therethrough, a carriage supported upon said frame, and above said sections, swinging shoes 46 and 50 of said carriage together with frame-supports thereof forming journals for carrying matching twisting-sections with the lower series of sections in the bed, means of twisting the sections when they are coincident, power devices of the bed-frame reversibly connected with chain belting traveling around sprockets arranged at opposite ends of the carriage, a laterally-movable arm on said carriage having a predetermined movement for intermittingly engaging devices for stopping and starting the carriage when the sections thereof are coincident with the sections of the bed, and mechanism for retaining the carriage at opposite ends of the bed for short periods of time and for reversing the movement thereof, substantially as described.

7. In a wire-fence machine, the combination of a double series of twister-sections carrying strand-wires and suitably adjusted in a bed-frame and at intervals apart thereon, cable-sections carried at opposite ends of the series, a shifting carriage carried above said sections provided with swinging shoes 46 and 50 for retaining sections carrying a weft-wire, a power-shaft and reversible clutch parts carried thereby, a vertical shaft 61 intermittingly actuated through the reversible clutch parts and imparting at its lower end movement to a transverse shaft, a chain belting connecting with devices on the carriage and traveling around suitable idlers, receiving its momentum for advancing the carriage through the transverse shaft at the lower end of the shaft 61, the mechanism for alternately stopping and starting the carriage and devices carried by said carriage for actuating suitable clutch parts when the sections thereof are coincident with the cable-sections for locking the shifting mechanism and simultaneously actuating suitable clamp parts and for reversing the movement of said carriage immediately upon the twisting of the cable-sections, substantially as described.

8. The mechanism for imparting movement to the cable-sections and clamping devices simultaneous as the carriage twister-sections are coincident with the cable-sections, comprising suitable members carried by the carriage contacting with an arm 103 or its equivalent for throwing in suitable clutch parts of the power-shaft for actuating mechanism controlling the movement of the cable-sections, in combination with the operating-arm 124 intermittingly actuated through connecting devices of the clamps at predetermined periods for releasing the clutch devices of the power-shaft and for imparting movement to the carriage, substantially as described.

9. The mechanism for imparting movement to the cable-sections and clamping devices simultaneous as the carriage twister-sections are coincident with the cable-sections, comprising duplicate contact-plates 102 of the carriage engaging an arm 103 for throwing in certain clutch parts through a revoluble arm 100 for actuating mechanism controlling the movement of the cable-sections, an arm 124 having one end movable by contact with parts of the clamping devices and its opposite end arranged to engage the revoluble arm 100 for releasing the clutch parts and stopping the rotation of the clamping devices and the twisting of the cable-sections, and clutch devices reversibly actuated through the movement of said parts for reciprocating the carriage to the opposite end of its bed, substantially as described.

10. The mechanism for imparting movement to the cable-sections and clamping devices simultaneous as the carriage twister-sections are coincident with the cable-sections, comprising the power-shaft with clutch parts 91 and 92, and an auxiliary shaft 76 intermittingly actuated through suitable gearing connected with the power-shaft and having connection with devices for controlling the movement of the cable-sections, contact-plates of the carriage, a suitable arm lying in the path of travel and arranged to be actuated by contact with said plates, a revoluble plate carried by the gearing referred to arranged for locking or releasing the clutch parts 91 and 92 and arranged to be locked through the movement of the arm by contact of the plates on the carriage, and released through an arm 124 or its equivalent by contact of devices having a predetermined movement for locking the cable-twister sections, and mechanism for reversing the movement of said carriage simultaneous through the action of certain clutch parts, substantially as described.

11. The mechanism for imparting movement to the cable-sections and clamping devices simultaneous as the carriage twister-sections are coincident with the cable-sections, comprising suitable members on the carriage for engaging parts having connection with reversible clutch parts on the power-shaft for actuating mechanism controlling the movement of the cable-sections, in combination with an arm 124 and the plate 119 carrying a series of rollers intermittingly engaging devices through which movement is imparted to the arm 124 for releasing the clutch devices of the power-shaft and for imparting movement to the carriage, substantially as described.

12. In a wire-fence machine, the combination with a shiftable carriage, of swinging shoes comprising the bevel-plates 50 connected with the carriage through the short arms 52 and 53, and a lever connected with said plates for releasing and locking the plates in position, substantially for the purpose herein described.

13. In a wire-fence machine, the combination with a shiftable carriage provided with shoes 31 fixedly secured to said carriage, of the plates 46 having a swinging connection with and pivoted to said shoes and a spring-held key for releasing and locking said shoes, substantially for the purpose and in the manner herein described.

14. In a wire-fence machine, the combination with a shiftable carriage provided with swinging shoes, of the transverse shafts 34 and 34$^a$, carrying sprocket-pinions connected by chain belting having connection with reversibly-movable parts in the machine, the cam 36 on the shaft 34, the reach 39 pivotally connected to the shaft 34$^a$, and its free end carrying a roller movable in an open face on the cam, and the roller 45 revoluble with the shaft 34$^a$, arranged substantially in the manner and for the purpose described.

15. In a wire-fence machine, the combination with a bed-plate and a shiftable carriage movable on said bed, and connected with power devices and mechanism for imparting a stopping and starting movement to the carriage as it traverses the bed, a power-shaft and clutch parts connected with clutches 74 and 75 on said shaft, an auxiliary shaft and cams movable therewith, of the clutch-arms 82 and 83 pivoted to a shiftable frame 88 and their opposite ends engaging the clutch parts and the cams on the auxiliary shaft, and a rod 89 connected with said frame 88 and its opposite end with mechanism whereby the said frame 88 may be shifted for reversing the clutch parts, substantially for the purpose described.

16. In a wire-fence machine, the combination with a stationary frame and bed-plate in which is arranged twister-sections and a shiftable carriage movable on said bed, a power-shaft and connection of the carriage with the shaft for reciprocating said carriage, and devices on the power-shaft actuated by means on an auxiliary shaft for insuring a positive stop of the carriage as it reaches the end of its movement, comprising a drum, the shoes 128 pivotally connected with devices intermittingly engaged by mechanism on the auxiliary shaft for causing the shoes to impinge the surface of the drum, substantially for the purpose described.

17. A carriage for a fence-machine, provided with oppositely-arranged shafts intermittingly actuated, each shaft carrying mechanism arranged for engaging parts of a stationary frame for locking the movement thereof at predetermined periods, devices on each shaft for engaging twisting devices in the aforesaid frame, sprocket-pinions on each shaft and chain belting suitably actuated engaging said pinions, for the purpose described.

18. A carriage for a fence-machine, comprising parallel frame-supports having reach connections, duplicate shafts oppositely arranged in suitable bearings, each shaft carrying driven devices and means for engaging twisting-sections of a stationary frame, a reach movably connected with the driven devices on the shafts, sprocket-pinions on each shaft, intermittingly-actuated driving devices, a chain actuated by said driving devices and engaging the sprockets of the carriage for imparting movement to the carriage and for actuating the said shafts, substantially as and for the purpose specified.

19. A carriage for a fence-machine, provided with oppositely-arranged driven shafts, devices on each shaft coacting with means of a stationary frame, a cam on one shaft, a reach having its free end engaging said cam and its opposite end fulcrumed on the opposite shaft, and a chain-drive engaging sprockets on each shaft, substantially as described.

20. A carriage for a fence-machine, provided with oppositely-arranged shafts, driven gears on each shaft, chain belting suitably driven engaging said gears, a reach having one end pivotally arranged on one of said shafts and having its opposite end engaging a cam carried by the opposite shaft, and means on the reach for engaging successive devices overlying the carriage, substantially as described.

21. A carriage for a fence-machine, provided with oppositely-arranged shafts intermittingly actuated, each shaft carrying mechanism arranged for engaging parts of a stationary frame for locking the movement thereof at predetermined periods, devices on each shaft for engaging twisting devices in the aforesaid frame, sprocket-pinions on each shaft and chain belting suitably actuated engaging said pinions, and contact-plates on the carriage engaging devices of the machine for controlling the movement of cable-sections thereof, substantially as described.

In testimony whereof we affix our signatures in presence of two witnesses.

JOHN SOMMER.
PETER W. SOMMER.

Witnesses to signature of John Sommer:
JOHN Y. RICH,
HOMER J. RICH.

Witnesses to signature of Peter W. Sommer:
C. S. TAYLOR,
LIZZIE WILSON.